US007036722B2

(12) United States Patent
Fujioka

(10) Patent No.: US 7,036,722 B2
(45) Date of Patent: May 2, 2006

(54) AUTOMATIC TRANSACTION MACHINE

(75) Inventor: Toshinori Fujioka, Owariasahi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/101,477

(22) Filed: Apr. 8, 2005

(65) Prior Publication Data

US 2005/0173516 A1 Aug. 11, 2005

Related U.S. Application Data

(63) Continuation of application No. 10/395,697, filed on Mar. 25, 2003.

(30) Foreign Application Priority Data

Mar. 26, 2002 (JP) .............................. 2002-86433

(51) Int. Cl.
*G06Q 40/00* (2006.01)

(52) U.S. Cl. ...................................... 235/379; 235/381

(58) Field of Classification Search ........ 235/379–382; 705/35, 43, 45; 902/7, 11
See application file for complete search history.

(56) References Cited

U.S. PATENT DOCUMENTS 4,166,945 A 9/1979 Inoyama et al.
4,365,700 A 12/1982 Arimoto et al.
4,602,332 A 7/1986 Hirose et al.

(Continued)

FOREIGN PATENT DOCUMENTS

EP 0 961 245 A2 12/1999
JP 61005373 A 1/1986

(Continued)

*Primary Examiner*—Uyen-Chau N. Le
(74) *Attorney, Agent, or Firm*—McDermott Will & Emery LLP

(57) ABSTRACT

When a user cancels a transaction associated with a deposit at an automatic transaction machine, information on the account for which the transaction is intended is sent to a host computer. When deposited bills are rejected at a high rate, the account information also is sent to the host computer. Because these acts often occur during counterfeit tests, the host computer stores the account information in a monitoring database, and monitors the cancellation frequency, rate of rejection, and the like. Accounts which are determine to have a high possibility of being used for counterfeit tests, based on results such as cancellation frequency, are handled as accounts requiring special attention. When a transaction takes place for such an account, measures can be taken including stopping the transaction or transmitting a warning. In this way, counterfeit tests can be monitored and prevented.

12 Claims, 5 Drawing Sheets

U.S. PATENT DOCUMENTS

| | | | | |
|---|---|---|---|---|
| 5,103,079 | A | 4/1992 | Barakai et al. | |
| 5,553,320 | A | 9/1996 | Matsuura et al. | |
| 5,606,157 | A | 2/1997 | Awatsu et al. | |
| 5,673,333 | A | 9/1997 | Johnston | |
| 5,854,581 | A | 12/1998 | Mori et al. | |
| 5,878,337 | A | 3/1999 | Joao et al. | |
| 5,880,444 | A | 3/1999 | Shibata et al. | |
| 5,897,625 | A | 4/1999 | Gustin et al. | |
| 5,982,918 | A * | 11/1999 | Mennie et al. | 705/43 |
| 6,021,883 | A | 2/2000 | Casanova et al. | |
| 6,068,194 | A * | 5/2000 | Mazur | 235/380 |
| 6,230,928 | B1 | 5/2001 | Hanna et al. | |
| 6,363,164 | B1 | 3/2002 | Jones et al. | |
| 6,650,767 | B1 | 11/2003 | Jones et al. | |
| 2001/0020638 | A1 | 9/2001 | Uematsu et al. | |
| 2002/0016910 | A1 * | 2/2002 | Wright et al. | 705/51 |
| 2003/0182214 | A1 | 9/2003 | Taylor | |

FOREIGN PATENT DOCUMENTS

| | | |
|---|---|---|
| JP | 07254028 A | 10/1995 |
| WO | WO 98/40839 | 9/1998 |

* cited by examiner

AUTOMATIC TRANSACTION MACHINE

RELATED APPLICATION

This application is a continuation of Application No. 10/395,697 filed Mar. 25, 2003.

BACKGROUND OF THE INVENTION

1. Field of the Invention

The present invention relates to an automatic transaction machine for deposits and withdrawals of bills.

2. Description of the Related Art

Cash automatic transaction machines (ATMs) are used to receive and dispense money to users via bill handling machines or the like. ATMs house money handling devices for supplying, storing, and dispensing paper money or bills. For deposits, the bill handling device discriminates the denomination and authenticity of the bills fed in through the deposit port, money that are determined to be genuine are temporarily stored in a temporary stacker, and any other bills are rejected through the deposit port. Authentication is based on the optical properties, electromagnetic properties, paper thickness, or the like of the bills. When the user subsequently confirms the amount of the deposit, the bills stored in the temporary stacker are stored into storage boxes corresponding to the denomination, by the bill handling machine. In addition, the ATM communicates the amount of the deposit, the account information, and the like to a host computer.

SUMMARY OF THE INVENTION

Counterfeit bills have been on the increase recently. Producers of counterfeit bills sometimes place deposits at automatic transaction machines to test whether the counterfeit will be determined to be genuine to check the counterfeit accuracy. Cancel of the deposit make it possible to test the accuracy of the counterfeit bills without the bills being got into the machine, because all bills including what is determined as counterfeit bills are returned to the user by the cancel operation.

The possibility of being misused to test counterfeit bills in this manner was never considered in conventional automatic transaction machines. The production of counterfeit bills can be discouraged by avoiding such misuse. In this regard, an object of the present invention is to provide a technique for preventing counterfeit bills from being checked using automatic transaction machines.

To achieve at least part of this object, the automatic transaction machine connected by a communications line to a host computer in the present invention communicates with the host computer when a transaction is discontinued during a deposit to an account. This communication should comprise data on the account for which the transaction is intended.

Producers of counterfeit bills often deposit bills into an automatic transaction machine to test the bills, and then cancel the transaction to recover the bills. According to the present invention, such cancellations are determined to be an act corresponding to a counterfeit test, and the account information is transmitted to the host computer. Based on such information, the host computer can monitor acts as counterfeit tests in relation to accounts.

The automatic transaction machine in the present invention may transmit information when bills are determined to be not genuine, that is, bills determined to be counterfeit, and bills which cannot be sufficiently determined to be genuine exceed a predetermined level. The predetermined level serving as the determining standard value for such communication may be a predetermined number of paper bills, and may be a number calculated based on a predetermined ratio and the number of deposited bills. During a counterfeit test, it may be assumed that a large quantity of bills will be determined to be not genuine as a result of the discrimination of authenticity. Under these conditions, it is therefore possible to monitor acts of counterfeit tests by means of such communication.

The automatic transaction machine of the present invention can get predetermined kind of data which can be used to subsequent discrimination as a result of the discrimination and may also transmit the data. Such data include image data based on optical or magnetic patterns obtained by scanning the bills, denomination, serial numbers of the bills, paper thickness, dimensions, and so forth. Such data can be transmitted for actual use in detailed discrimination of authenticity by the host computer. When bills are determined to be counterfeit by the detailed discrimination, information related to the counterfeit bills can become more complete.

One modification of the present invention is a management device for controlling the above automatic transaction machine. For example, the management device can be constructed in the host computer, which receives discontinuation data from the automatic transaction machine, and stores the data according to accounts and outputs statistical data based on the discontinuation data. Discontinuation data are data indicating that a deposit transaction to an account has been discontinued by the user or because of the quality of the bills that has been deposited. Discontinuation by the user can be a cancellation of the transaction, for example. Discontinuation because of the quality of the bills can be when bills determined to be not genuine is over a certain level. Because such discontinuations are often related to acts corresponding to counterfeit tests, the discontinuation data are stored according to accounts to allow such acts corresponding to counterfeit tests to be monitored.

The management device of the present invention can determine whether or not the account for which the deposit is intended corresponds to an account requiring special attention with a high possibility of being used for counterfeit tests. When the account is determined as an account requiring special attention, the management device should notify it to a predetermined point of contact. This will allow an agent or the like to actually check whether or not a counterfeit test is underway.

When the account for which the deposit is intended corresponds to an account requiring special attention, the automatic transaction machine should also be controlled in such a way as to forcibly discontinue the transaction. For example, if the transaction is discontinued without the bills or the like being rejected during the transaction, the counterfeit test can be stopped while in process, and can be easily checked by an agent or the like. When a transaction is discontinued after the bills or the like has been rejected, a counterfeit test can still be attempted.

In the present invention, a determination on whether or not an account requires special attention is made on the basis of predetermined conditions. Accounts may be individually organized according to whether or not they require special attention, and determinations may be made on the basis of discontinuation information controlled according to account. In the latter option, for example, accounts with discontinued transactions over a certain level can be considered accounts requiring special attention. Accounts with a cancellation frequency over a certain level and accounts with a rejection rate over a certain level can also be treated as accounts requiring special attention.

The present invention can be constructed in a variety of embodiments not limited to the above automatic transaction machine and management device. For example, it can be constructed as a method for controlling automatic transaction machines and management devices. It may also be constructed in the form of computer programs for executing such control by computer, as well as recording media on which such programs are recorded. Examples include a variety of computer-readable media, such as floppy disks, CD-ROM, DVD, magnetic optical disks, IC cards, ROM cartridges, punch cards, bar codes and other printed materials on which codes are printed, internal computer memory devices (memory such as RAM or ROM), and external memory devices.

DESCRIPTION OF THE PREFERRED EMBODIMENTS

Embodiments of the invention are described below.

Figure 1:
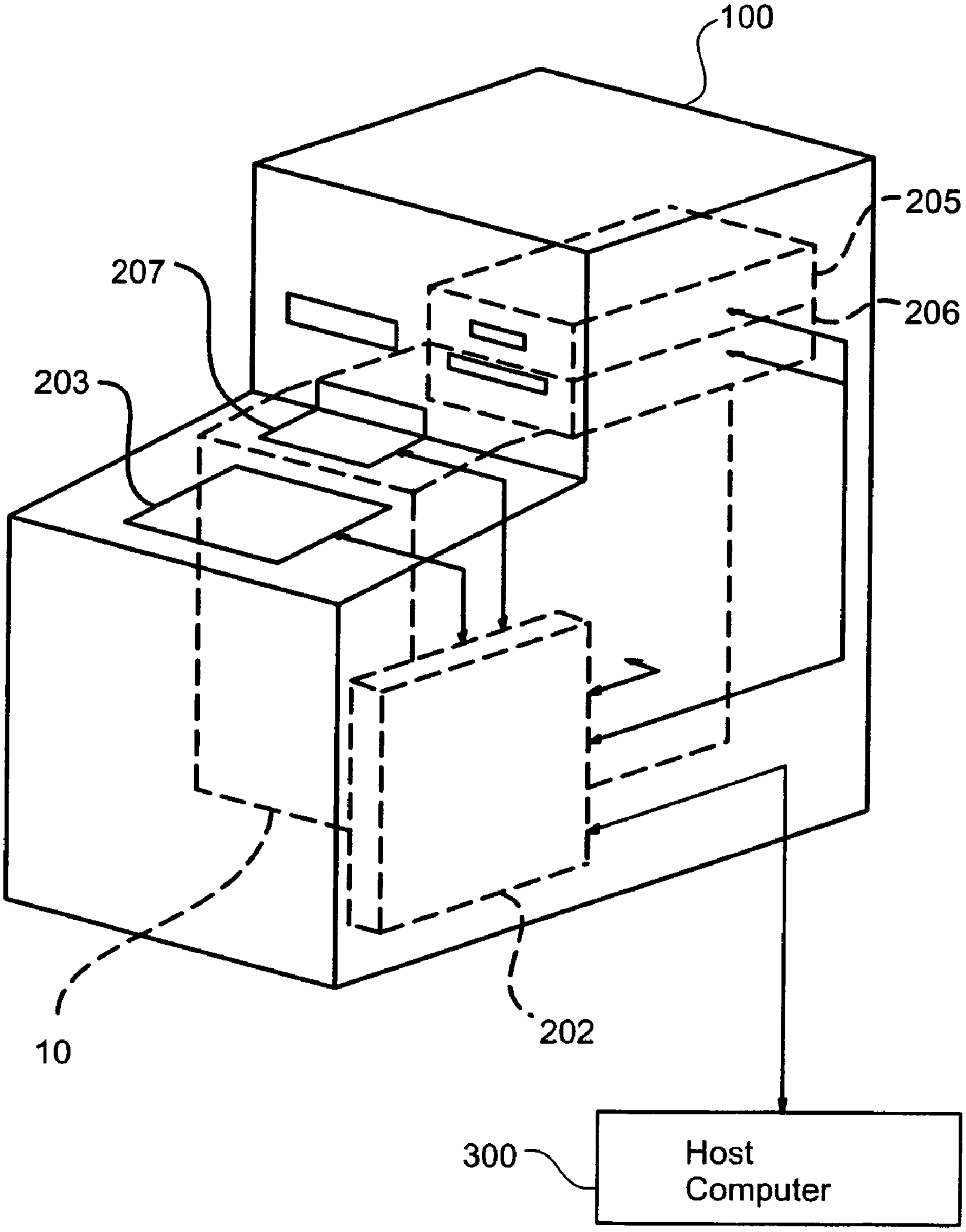
FIG. 1 is a schematic illustration of the structure of a automatic transaction machine 100.

A. Overall Structure;

FIG. 1 is a schematic illustration of the structure of the automatic transaction machine 100 in the present embodiment. The automatic transaction machine 100 is a device that is located at banks or the like for users to operate in making deposits.

The automatic transaction machine 100 (ATM) of the present embodiment is furnished with the following units in the illustrated layout. A card transaction machine 205 reads data recorded on magnetic strip cards such as what are referred to as cash cards. The data recorded on the card includes, for example, the financial institution number, type of account, user account number, and the like.

The operating component 203 is a user interface for displaying information for deposit/withdrawal transactions and input for making deposits. Although a touch panel is used in this embodiment, combinations of displays and push button switches or the like can also be used.

Bills are given to and received from the user through a bills deposit port 207. Bills that are deposited by the user through the bills deposit port 207 when making a deposit is inspected by an internally housed bills handling device 10 and stored storage boxes corresponding to denominations. During withdrawals, the bills handling device 10 dispenses bills in the amount designated by the user, to the user through the bills deposit port 207.

The operations of the units in the ATM 100 are controlled by a control unit 202. The control unit 202 is composed of an internal microcomputer equipped with memory and a CPU. The control unit 202 gives and receives information to the various units as indicated by the arrows in the figure to control the operation of the ATM 100 as a whole. The control unit 202 is connected by a communications line to a host computer 300. The control unit 202 transmits transaction-related data to the host computer 300, so that processes such as deposits to and withdrawals from the user account are carried out by the host computer 300.

B. Bills Handling Device

Figure 2:
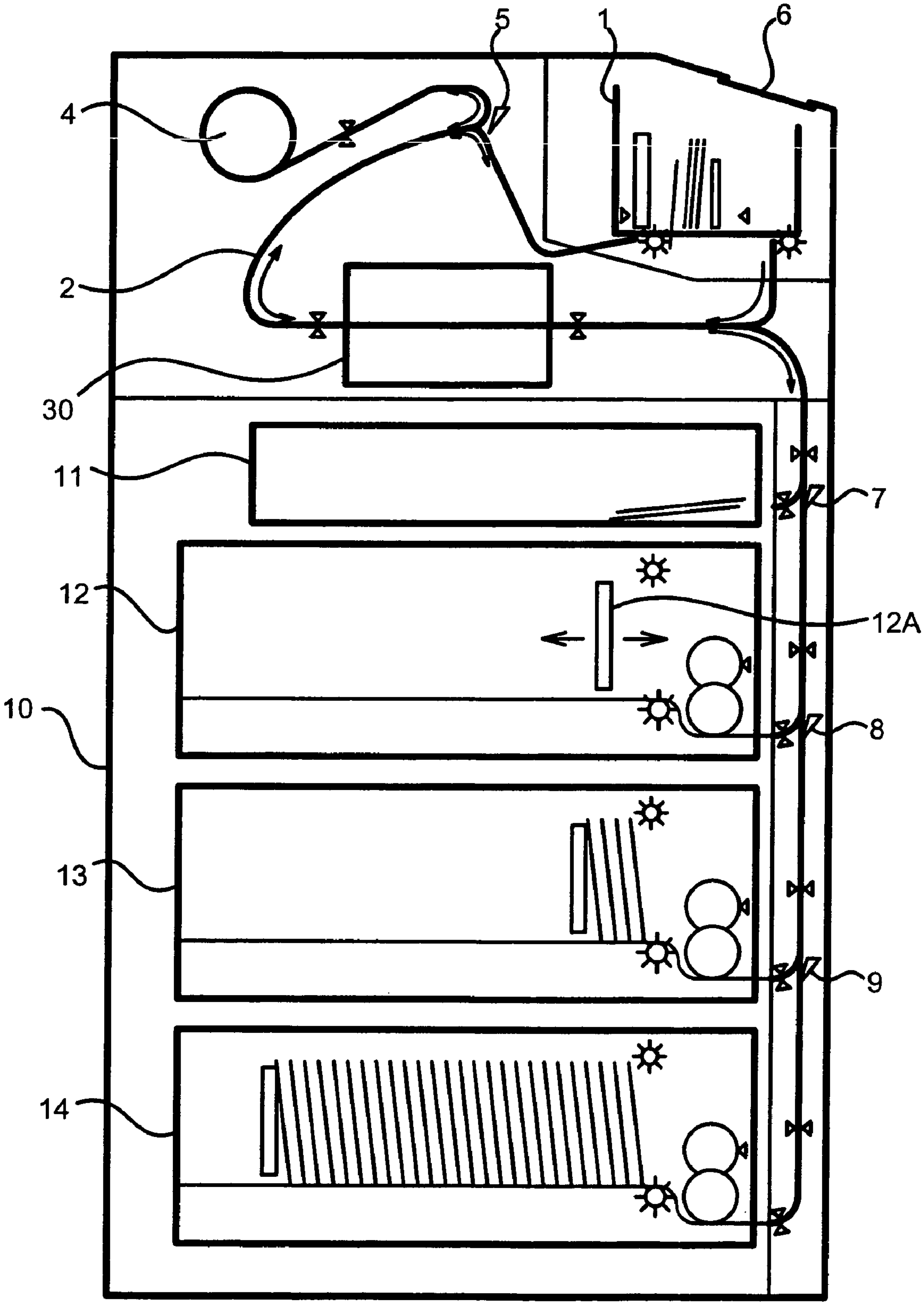
FIG. 2 is a schematic side cross section of the structure of a bill handling device 10.

FIG. 2 is a schematic side cross section of the structure of the bill handling device 10. A deposit/withdrawal component 1 is a slot through which bills are given to and received from the user. The insert opening of the deposit/withdrawal component 1 is provided with a shutter 6. The shutter 6 automatically opens and closes in conjunction with the bills deposit port 207 of the ATM 100 described above.

The interior of the bill handling device 10 is provided with storage boxes 12 through 14 for storing legitimate bills (hereinafter referred to as genuine bills) which can be used for withdrawals, a reject box 11 for holding bills determined to be abnormal (hereinafter referred to as rejected bills), and a temporary stacker 4 for temporarily holding bills as it is conveyed in the machine.

The denominations stored in the storage boxes are predetermined by the storage cache units. The storage cache 12 is provided with a slidable push plate 12A for holding the bills in an orderly fashion so as to ensure that the sequence in which the bills is arranged in the cache does not become disorganized. The other storage boxes 13 and 14 are also provided with similar push plates.

Bills are conveyed by means of a conveyor 2 between the deposit/withdrawal component 1 and the various storage boxes. The conveyor 2 is a mechanism for conveying bills using a conveying mechanism such as a roller or belt. The line of the conveyor 2 is provided with gates for switching the destination to which the bills is conveyed. Gate 5 switches between the temporary holding cache 4 and the deposit/withdrawal component 1. Gate 7 switches the conveyance destination to the reject box 11. Gates 8 and 9 switch the conveyance destination to storage boxes 12 through 14.

A discriminating component 30 is provided on the line of the conveyor 2. The discriminating component 30 checks each bill that passes through one at a time, and outputs the results. The results of the discrimination include the denomination of the bills, its genuineness, and the like. The discrimination process can take place using various types of data, such as image data obtained by scanning, magnetic properties, and optical properties relative to UV rays.

The discrimination process takes place when deposits are counted, when deposits are accepted, and when withdrawals are made. The deposit counting process is a process in which bills are conveyed to the temporary stacker 4 as the bills from the deposit/withdrawal component 1 are counted. The deposit accepting process is a process that takes place after the user checks the counted funds and the deposit display is shown, wherein the bills in the temporary stacker 4 are stored by denomination in storage boxes 12 through 14. Withdrawal is a process in which bills are withdrawn from storage boxes 12 through 14. Bills that are determined by the discriminating component 30 to be abnormally supplied, bills that are determined to be extremely defaced, or the like is handled as rejected bills. Bills that are determined to be rejected bills during deposit acceptance or withdrawal are stored in the reject box 11. Bills that are determined to be rejected bills when a deposit is counted are returned to the deposit/withdrawal component 1.

Although not shown in the figure, a control unit is provided in the interior of the bills handling device 10. The control unit is constructed in the form of a microcomputer equipped with memory and a CPU, and controls the operation of the bills handling device 10 by means of a program prepared in advance.

Figure 3:
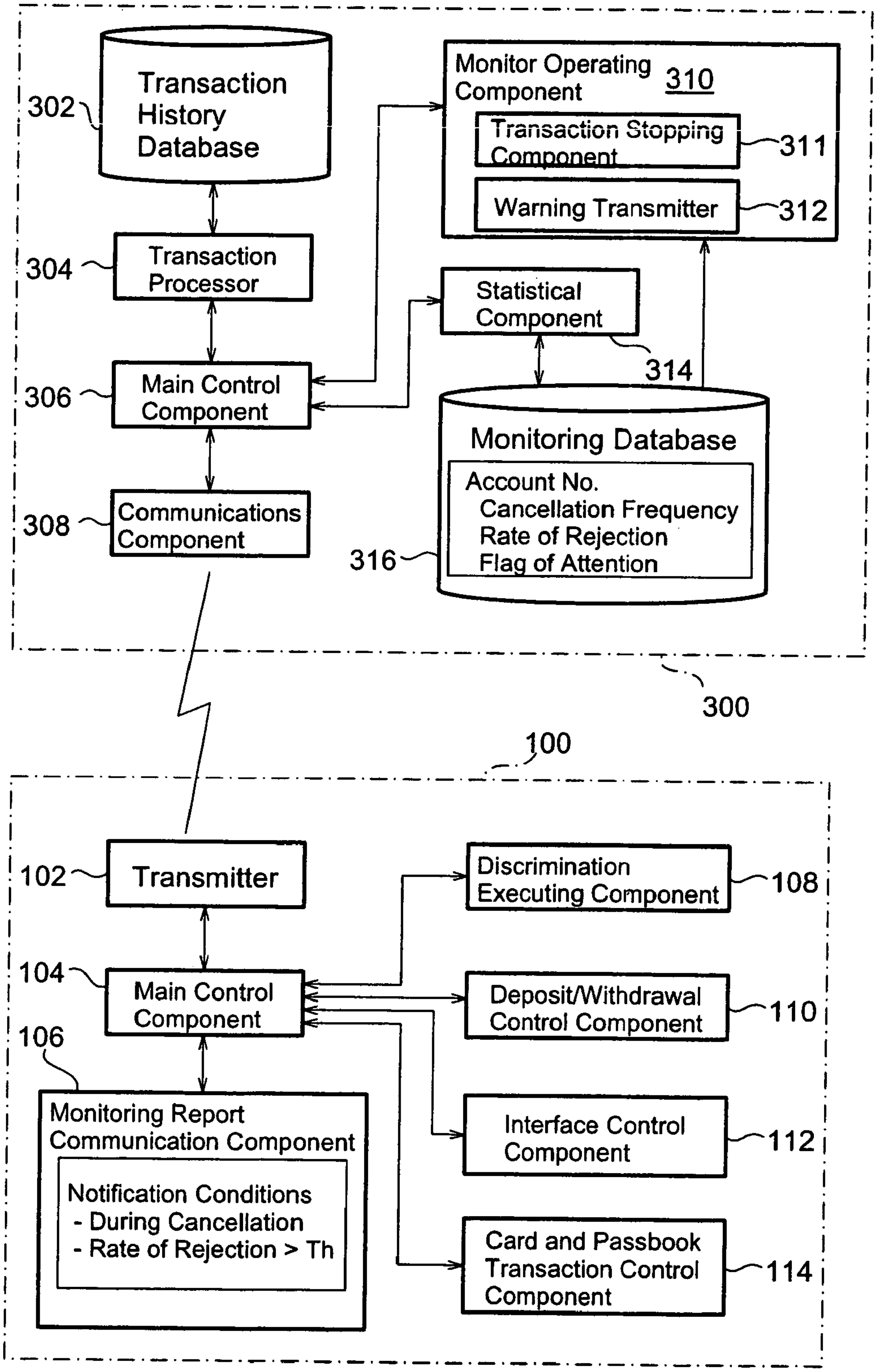
FIG. 3 is a block diagram of the functions of the host computer 300 and ATM 100.

C. Functions;

FIG. 3 is a block diagram of the functions of the host computer 300 and ATM 100. The various functions in the block diagram are based on software. The functions can also be based on hardware.

The functions of the host computer 300 are run in the following manner under the control of the main control component 306. The communications component 308 controls communication with the ATM 100. Examples of information transmitted from the ATM 100 to the host computer 300 include transaction details, the account number for which the transaction is intended, code number, and funds deposited/withdrawn. The presence or absence of a cancelled transaction and the percentage of rejected bills, that is, the proportion of deposited bills that has been rejected, are transmitted from the ATM 100 to the host computer 300 as information for monitoring counterfeit tests using the ATM 100 in the present embodiment. Information transmitted from the host computer 300 to the ATM 100 includes the operations that have been entered to control the transaction by the ATM 100.

Based on the information transmitted from the ATM 100, a transaction processor 304 executes transaction processes such as deposits, withdrawals, and transfers. A transaction history database 302 maintains the transaction history for each account.

The host computer 300 also has the function of monitoring counterfeit tests. A monitoring database 316 maintains data serving as criteria for determining whether or not an account has been used to test counterfeit. A statistical component 314 writes such data and outputs tables, graphs, or the like.

The figure gives an example of the recorded contents of a monitoring database 316. Producers of counterfeit select a deposit transaction and deposit bills which includes counterfeit bills to test whether or not the bills will be determined to be genuine by the ATM 100, then cancel the transaction and recover the bills. In the process of producing counterfeit, it can be assumed that the rate of rejection will be relatively higher than when only genuine bills are deposited. The frequency of cancelled transactions, the rejection rate, and flags of attention are recorded for each account in the monitoring database 316 in view of the above circumstances in this example. A flag of attention is a flag for specifying accounts determined to have a high possibility of being used for counterfeit tests based on information such as cancellation frequency, rate of rejection, and the like. Because flags of attention are information related to user credibility, in the present example an operator is set based on the statistical output of the statistical component 314. This should be set upon verification that the high rate of rejection is not caused by the ATM. A flag of attention may be automatically set when the cancellation frequency or rate of rejection is over a certain level.

A monitor operating component 310 functions to prevent counterfeit tests during transactions by accounts that have been flagged. In this example, a transaction stopping component 311 stops an ATM 100 transaction (such as a deposit transaction), and a warning transmitter 312 transmits a warning to a predetermined point of notification. The point of notification can be personnel in charge of the ATM 100 at which the transaction is taking place, the police, or the like. The point of notification may vary depending on the results, such as the transaction cancellation frequency or rate of rejection.

The ATM 100 functions in the following manner under the control of a main control component 104. A transmitter 102 controls communications with the host computer 300. A discrimination executing component 108 identifies bills using the discrimination component 30. The deposit/withdrawal control component 110 controls the conveyance for deposit counting, deposit acceptance, withdrawals, and the like. An interface control component 112 displays images on the operating component 203 and inputs operations by the user. A card and passbook transaction control component 114 inputs the intended financial institution number, type of account and user account number from a cash card, passbook, or the like and records the information in the passbook.

The ATM 100 is provided with a monitoring report transmitter 106 which functions to monitor counterfeit tests. The monitoring report transmitter 106 functions to communicate information recorded in the monitoring database 316 to the host computer 300. In this example, at least either a transaction has been cancelled or the rate of rejection is greater than a predetermined threshold Th, the conditions for notification are determined to have been satisfied, and the information is communicated. The conditions of communication can vary according to the contents recorded in the monitoring database 316. Information can be communicated when even a single transaction has been cancelled, or information can be communicated when a certain number of transactions have been cancelled at a specific time or period by the same user (or same account).

Figure 4:
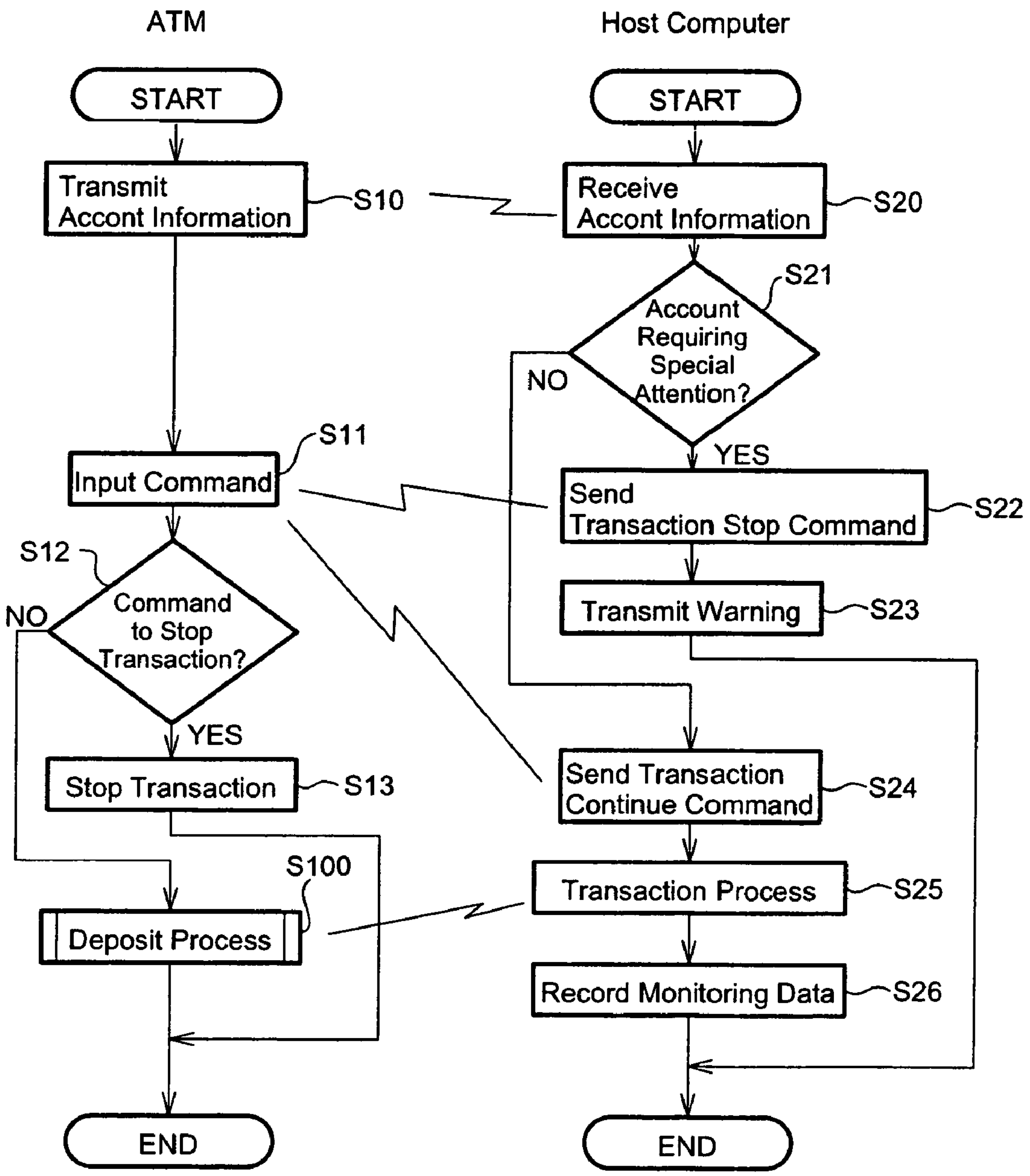
FIG. 4 is a flow chart of transaction processes.

D. Transaction Processes;

FIG. 4 is a flow chart of transaction processes. The left side depicts processes executed by the control unit 202 of the ATM 100, and the right side depicts processes executed by the host computer 300. These processes are started when the user selects a menu displayed by the ATM 100 and inserts a cash card or passbook. This is an example of a deposit.

When the process starts, the ATM 100 transmits information on the account for which the transaction is intended to the host computer 300 (step S10). The host computer 300 refers to the flags of attention in the monitoring database 316 to determine whether or not the account is an account requiring special attention (steps S20 and S21).

When the account does require attention, it is determined that continuing the transaction is undesirable, and the host computer 300 transmits a command to stop the transaction to the ATM 100 (step S22), and transmits a warning (step S23). When the ATM 100 receives the command to stop the transaction (steps S11 and S12), the current transaction is stopped (step S13). At this time, the transaction should be stopped without rejecting the bills and card, as if a malfunction had occurred. As a result of the communication, an agent goes to inspect the ATM 100 and checks to see if the deposited bills is genuine or not, so as to determine whether or not a counterfeit test has taken place.

Transactions may be stopped by rejecting bills, cards, or the like. In such cases, it is desirable, for example, to display instructions for the user to carry out the transaction at a teller window, such as "The transaction cannot be completed. Please take bills to teller window." Counterfeit tests can be prevented with such instructions because teller windows cannot be used for counterfeit tests.

When an account is not determined to require attention in step S21, the host computer 300 instructs the ATM 100 to continue the transaction (step S24). Upon receiving this command (steps S11 and S12), the ATM 100 carries out the following deposit process (step S100). During this process, the machine communicates with the host computer 300 as needed. When the host computer 300 receives data related to a transaction such as a deposit, the transaction process is carried out on the basis of the data (step S25). When data that should be recorded in the monitoring database 316 is received, the data is recorded (step S26).

Figure 5:
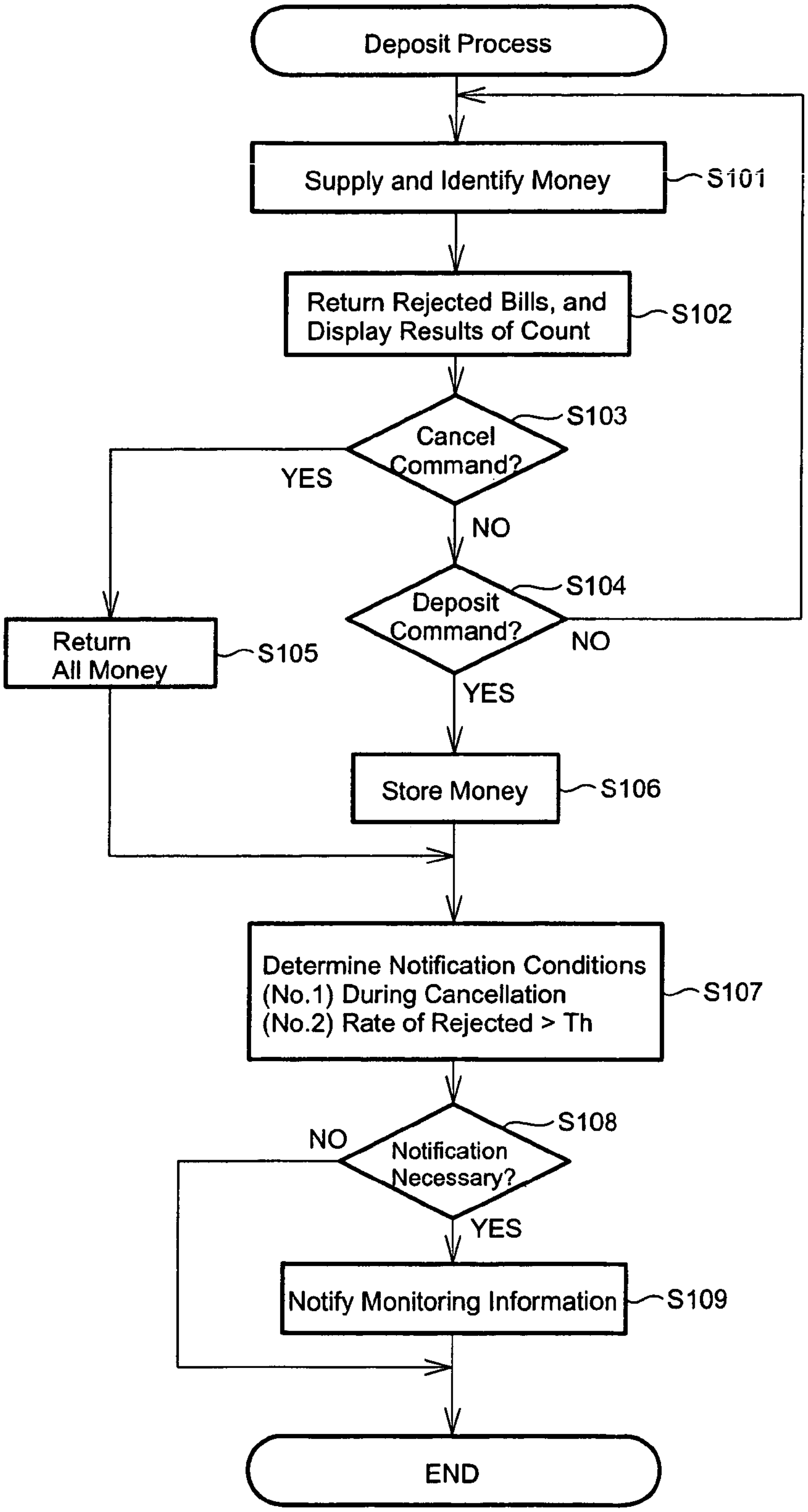
FIG. 5 is a flow chart of a deposit process.

FIG. 5 is a flow chart of a deposit process. The process is executed by the control unit 202 of the ATM 100. The user selects the deposit process from the operating component 203 illustrated in FIG. 1, and when the process begins, the control unit 202 conveys the bills deposited through the deposit/withdrawal component 1 into the machine, where the bills are checked for authenticity by the discrimination component 30 in FIG. 2 (step S101). At this point, genuine bills are held in the temporary stacker 4, and rejected bills are rejected through the deposit/withdrawal component 1. The control unit 202 opens the shutter 6 to return the rejected bills to the user, displays the result of the count of the genuine bills (step S102), and waits for the user's operation. This process is referred to as the deposit counting process.

When a user cancels the transaction (step S103), the control unit 202 dispenses the genuine bills from the temporary stacker 4 and returns all the bills (step S105). When the user decides to make the deposit, the bills in the temporary stacker 4 is stored into the storage boxes 12 through 14 corresponding to denominations (step S106). As the bills are stored, data necessary for the transaction process such as a deposit is communicated to the host computer 300. When other instructions are given, such as re-entering bills through the deposit/withdrawal component 1 (step S104), the processes for steps S101 and S102 are carried out again.

In the present example, a process for monitoring acts of counterfeit tests is also carried out in addition to the usual deposit process described above. The control unit 202 determines whether or not notification conditions have been met (step S107) when a transaction is cancelled (steps S103 and S105) or when the bills are finished being stored (step S106). The notification conditions have been met in the figure. In this example, it is determined that notification conditions have been met when at least either the transaction has been cancelled or the rate of rejection of the deposited bills is over a certain threshold Th. The threshold can be set to any value, including 0. For example, it can be set to a range greater than the maximum value for the rate of rejection statistically obtained when only genuine bills are used. The notification conditions are not limited to that, and can be set in a number of ways. The notification conditions may also be set on the basis of the number of rejected bills rather than the rate of rejection.

When it is determined that the notification conditions have been met (step S108), monitoring data is communicated to the host computer 300 (step S109). Monitoring data can include the account number, the fact that the transaction has been cancelled, the rate of rejection, and the like. Because the account number was transmitted in step S10 of FIG. 4, it may be omitted. As noted above, the information is recorded in the monitoring database 316 by the host computer 300.

The host computer 300 can keep comprehensive control of the cancellation frequency and rate of rejection for each account, and can calculate whether or not an act corresponding to a counterfeit test has been undertaken, based on the monitoring data. The automatic transaction machine described above can therefore monitor acts corresponding to counterfeit tests and can prevent the production of counterfeit.

E. Variants;

In the automatic transaction machine in this example, data used to identify the deposited bills may also be transmitted when the monitoring data is transmitted. Examples of such data include optical and magnetic pattern image data obtained by scanning the bills, the paper thickness, the dimensions, the denomination, and the bills serial number. This will allow the host computer 300 to use the image data to discriminate the authenticity of the bills in greater detail. Furthermore, if the bills are determined to be counterfeit, the data related to the counterfeit bills can become more complete.

This example is of a case in which transactions are controlled depending on whether or not an account is determined to require special attention (FIG. 4, steps S10–S12, S20–S24). For the purpose of monitoring acts corresponding to counterfeit tests, such processes may be carried out during transactions associated with deposits. Thus, when the user selects a transaction not associated with a deposit, such as a withdrawal, there is no need to determine whether or not the account requires special attention.

When an account is determined to require special attention in the present example, the transaction is stopped (step S22) and a warning is transmitted (step S23), but it is also possible to do just one or the other.

In the present example, the host computer 300 determined whether or not the account required special attention, but the ATM 100 may be provided with a monitoring database 316 to allow the control unit 202 to make such determinations.

The present invention is illustrated in various embodiments, but the invention is not limited to these examples alone and is capable of assuming a variety of other forms within the scope of the invention. For example, the above control processes can be carried out by software as well as by hardware.

The present invention can monitor acts corresponding to counterfeit tests and can prevent the production of counterfeit.

What is claimed is:

1. An automatic transaction machine for deposits or withdrawals of bills, comprising:

an operating component for a user to input an instruction of operation;

a deposit port through which a bill can be given and received;

a discriminating component configured to discriminate the bill;

a temporary stacker configured to store the bill temporarily;

a plurality of storage boxes each of which is configured to store bills of respective denomination; and a controller comprising:

(a) a deposit counting means configured to cause the discriminating component to discriminate the bill deposited through the deposit port, and then to feed the bill to the temporary stacker temporarily; and (b) a deposit storage means configured to cause the discriminating component to discriminate the bill stored in the temporary stacker, and then to store the bill in one of the plurality of storage boxes based on the discriminated denomination of the bill, wherein when a process by the deposit counting means, out of the deposit counting means and the deposit storage means, and a process of cancellation of transaction through the operating component during the process by the deposit counting means are both detected, the controller generates notification of the detection outside the automatic transaction machine, and the controller is configured to monitor a number of occurrences of the process of the cancellation by an identical user in a predetermined time.

2. An automatic transaction machine according to claim 1, wherein the controller is configured to transmit outside the automatic transaction machine:

information about the process of the cancellation; and image data obtained by the deposit counting means through the discriminating component.

3. An automatic transaction machine for deposits or withdrawals of bills, comprising:

an operating component for a user to input an instruction of operation;

a deposit port through which a bill can be given and received;

a discriminating component configured to discriminate the bill;

a temporary stacker configured to store the bill temporarily;

a plurality of storage boxes each of which is configured to store bills of respective denomination; and a controller comprising:

(a) a deposit counting means configured to cause the discriminating component to discriminate the bill deposited through the deposit port, and then to feed the bill to the temporary stacker temporarily; and (b) a deposit storage means configured to cause the discriminating component to discriminate the bill stored in the temporary stacker, and then to store the bill in one of the plurality of storage boxes based on the discriminated denomination of the bill, wherein:

when a process by the deposit counting means, out of the deposit counting means and the deposit storage means, and a process of cancellation of transaction through the operating component during the process by the deposit counting means are both detected, the controller generates notification of the detection outside the automatic transaction machine, and the controller is configured to count the number of occurrences of the process of the cancellation during the process by the deposit counting means.

4. An automatic transaction machine according to claim 3, wherein the controller is configured to detect a fact that the number of occurrences of the process of the cancellation has reached a predetermined number.

5. An automatic transaction machine for deposits or withdrawals of bills, comprising:

a deposit port through which a bill is given to and received;

a discriminating component configured to discriminate the bill;

a temporary stacker configured to store the bill temporarily;

a plurality of storage boxes each of which is configured to store bills of respective denomination;

a controller comprising:

(a) a deposit counting means configured to cause the discriminating component to discriminate the bill deposited through the deposit port, and then to feed the bill to the temporary stacker temporarily; and (b) a deposit storage means configured to cause the discriminating component to discriminate the bill stored in the temporary stacker, and then to store the bill in one of the plurality of storage boxes based on the discriminated denomination of the bill, wherein when a process by the deposit counting means out of the deposit counting means and the deposit storage means are detected, the controller decides whether a rate of rejection of bills during the process by the deposit counting means is greater than a predetermined threshold Th.

6. An automatic transaction machine according to claim 5, wherein when the rate of the rejection of the bills becomes greater than the predetermined threshold Th, the controller notifies the decision outside the automatic transaction machine.

7. A method of monitoring use of an automatic transaction machine, comprising:

for each of a plurality of deposit transactions at the automatic transaction machine, performing steps including:

a) detecting a user initiation of a deposit transaction at the automatic transaction machine;

b) receiving one or more bills in the automatic transaction machine;

c) performing a discrimination on each received bill;

d) receiving an instruction from the user to cancel the transaction, before completing processing of the deposit transaction with regard to the one or more received bills; and e) recording occurrence of the cancellation before completion of the deposit transaction; and monitoring number of the recorded occurrences of cancellations before completions of deposit transactions to identify activity as potentially suspicious.

8. The method of claim 7, wherein the monitoring comprises detecting frequency of occurrences of cancellations before completions of deposit transactions.

9. The method of claim 7, wherein the monitoring comprises detecting frequency of occurrences of cancellations before completion of deposit transactions for one identified account.

10. The method of claim 7, wherein the monitoring comprises detecting a predetermined number of the occurrences of cancellations before completions of the deposit transactions for one identified account within a predetermined time.

11. The method of claim 7, wherein the steps performed for each of the plurality of deposit transactions further include:

transmitting a notification out from the automatic transaction machine in response to the occurrence of the cancellation before completion of the deposit transaction.

12. The method of claim 11, wherein the notification comprises:

information regarding the cancellation before completion of the deposit transaction; and image data representing an image of one or more received bills.

* * * * *